United States Patent
Yamasaki

(10) Patent No.: US 8,503,101 B2
(45) Date of Patent: Aug. 6, 2013

(54) ZOOM LENS AND IMAGE PICKUP APPARATUS EQUIPPED WITH ZOOM LENS

(75) Inventor: Shinji Yamasaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/444,009

(22) Filed: Apr. 11, 2012

(65) Prior Publication Data

US 2012/0268625 A1    Oct. 25, 2012

(30) Foreign Application Priority Data

Apr. 19, 2011  (JP) ................. 2011-093215

(51) Int. Cl.
*G02B 15/14* (2006.01)
(52) U.S. Cl.
USPC .......................... 359/687; 359/683
(58) Field of Classification Search
USPC ................................. 359/683, 687
See application file for complete search history.

(56) References Cited

U.S. PATENT DOCUMENTS

| | | | |
|---|---|---|---|
| 6,710,933 B2 * | 3/2004 | Boku et al. | 359/687 |
| 7,417,801 B2 * | 8/2008 | Nakatani et al. | 359/687 |
| 7,551,366 B2 * | 6/2009 | Suzaki et al. | 359/687 |

FOREIGN PATENT DOCUMENTS

| JP | 2000227548 A | 8/2000 |
|---|---|---|
| JP | 2005107202 A | 4/2005 |

* cited by examiner

*Primary Examiner* — Scott J Sugarman
(74) *Attorney, Agent, or Firm* — Canon U.S.A., Inc. IP Division

(57) ABSTRACT

A zoom lens includes a first lens unit having a positive refractive power, a second lens unit having a negative refractive power, a third lens unit having a positive refractive power, and a fourth lens unit having a positive refractive power in order from an object side to an image side. The second and fourth lens units move during zooming, and the first and third lens units do not move for zooming. A focal length fw of the entire zoom lens at a wide-angle end, a focal length ft of the entire zoom lens at a telephoto end, a focal length f1 of the first lens unit, a focal length f2 of the second lens unit, and a focal length f4 of the fourth lens unit are appropriately set.

9 Claims, 17 Drawing Sheets

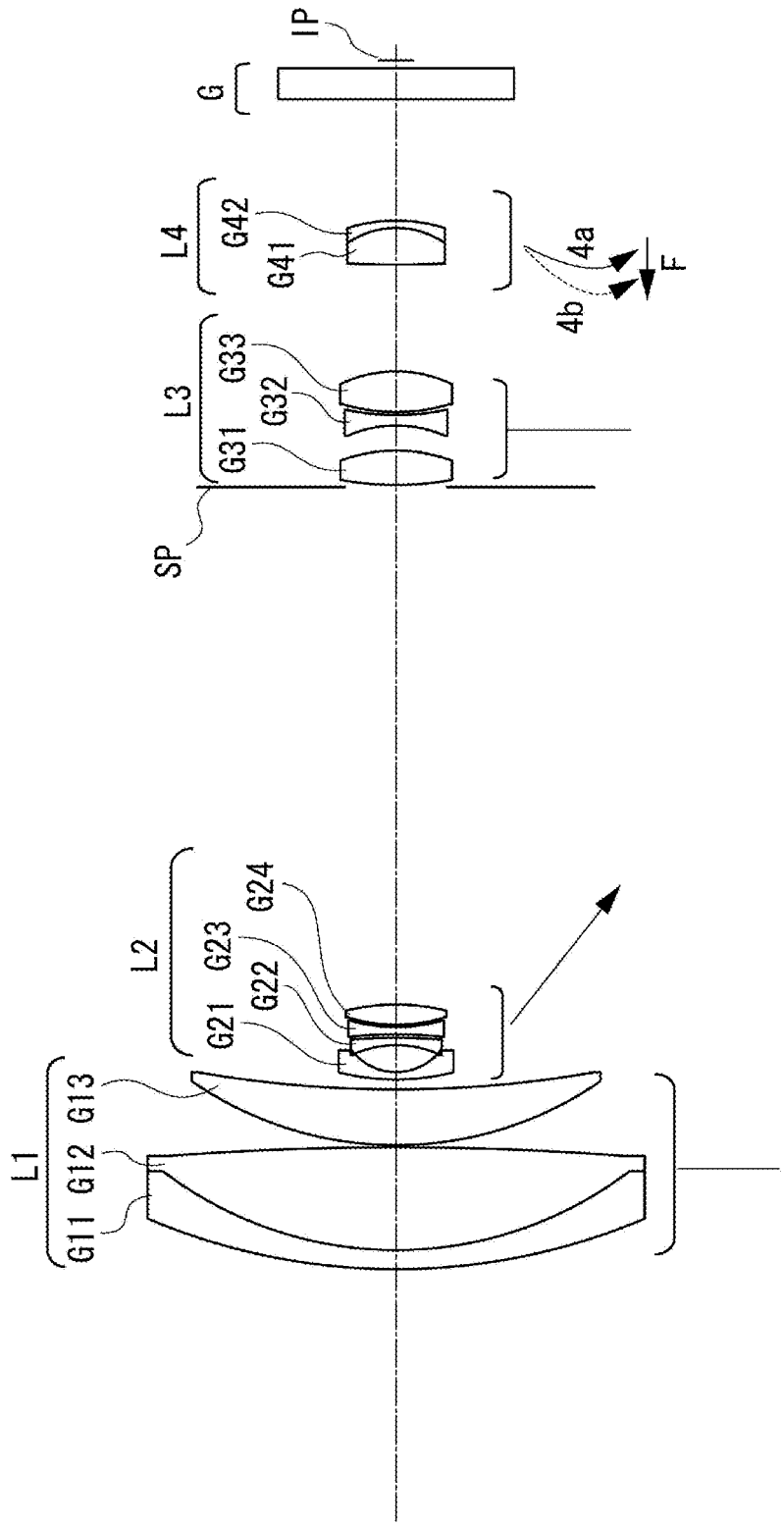

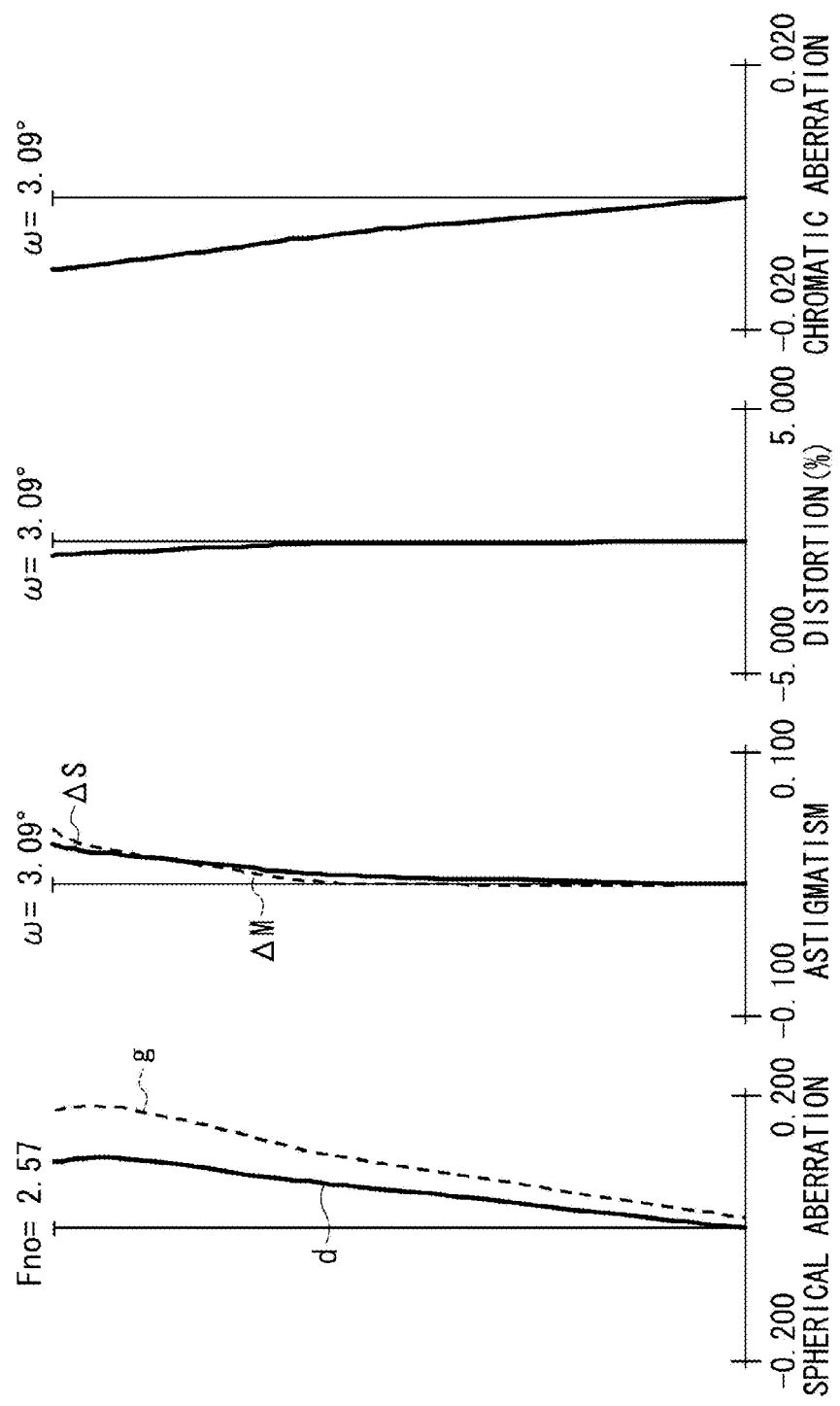

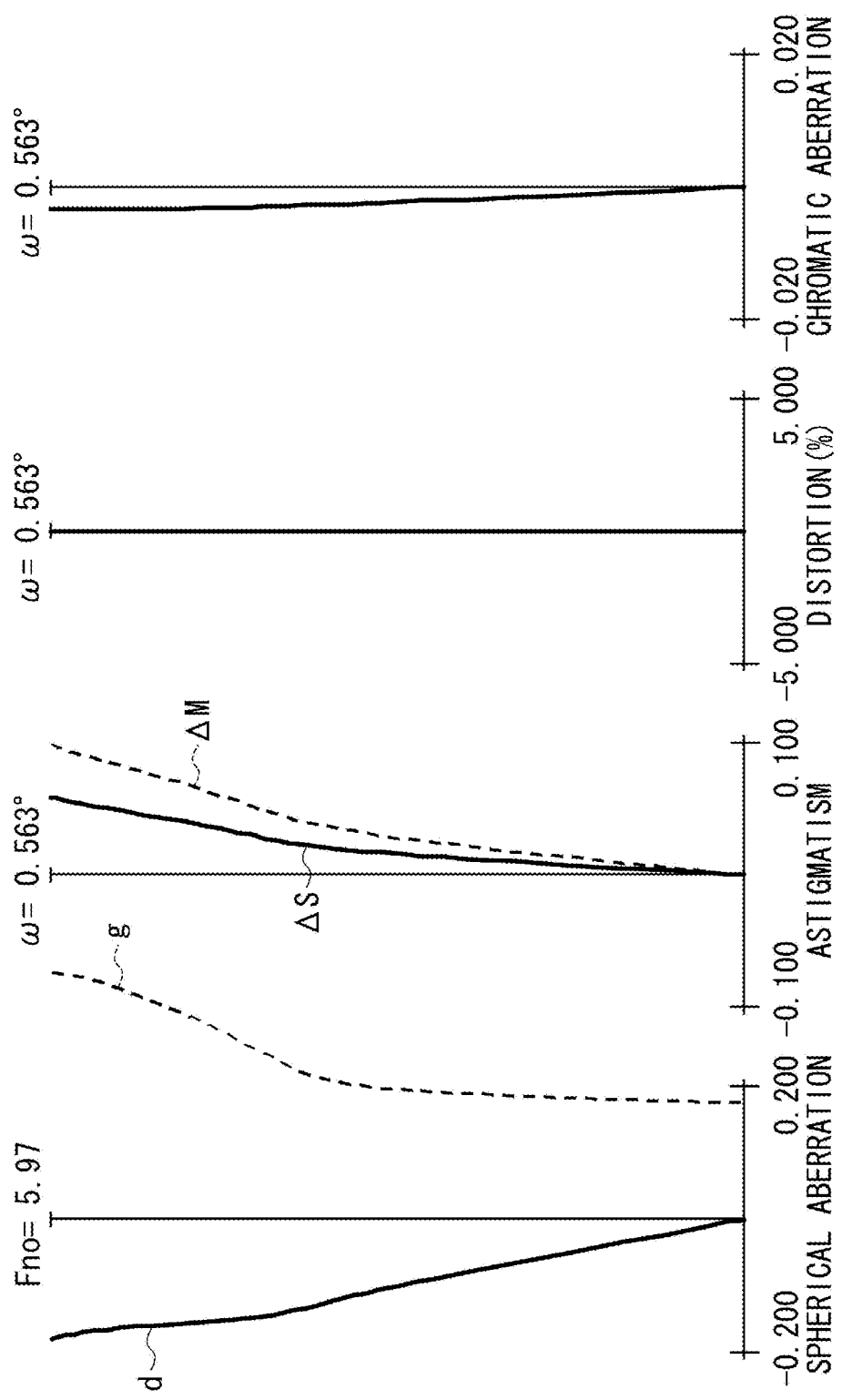

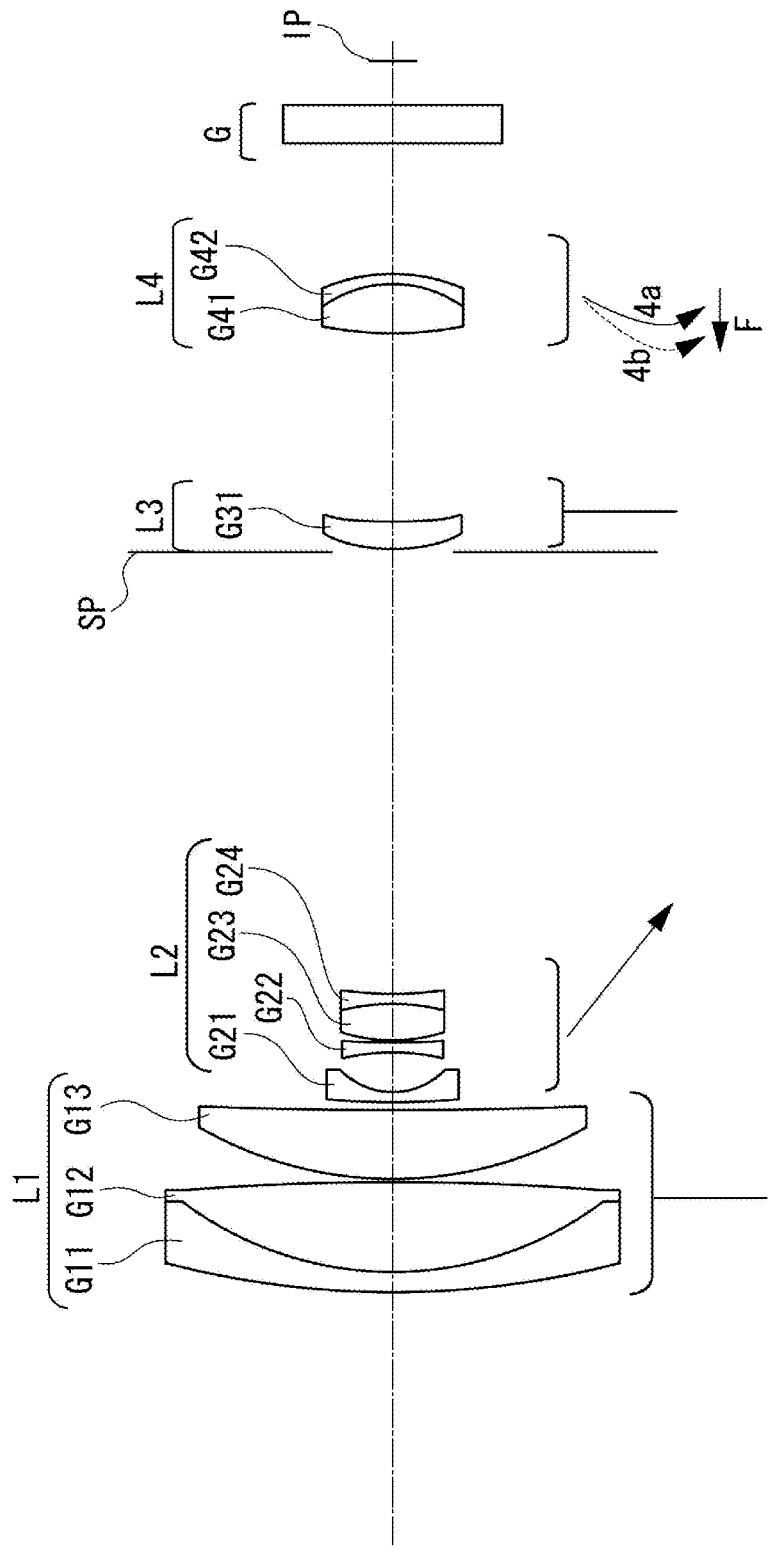

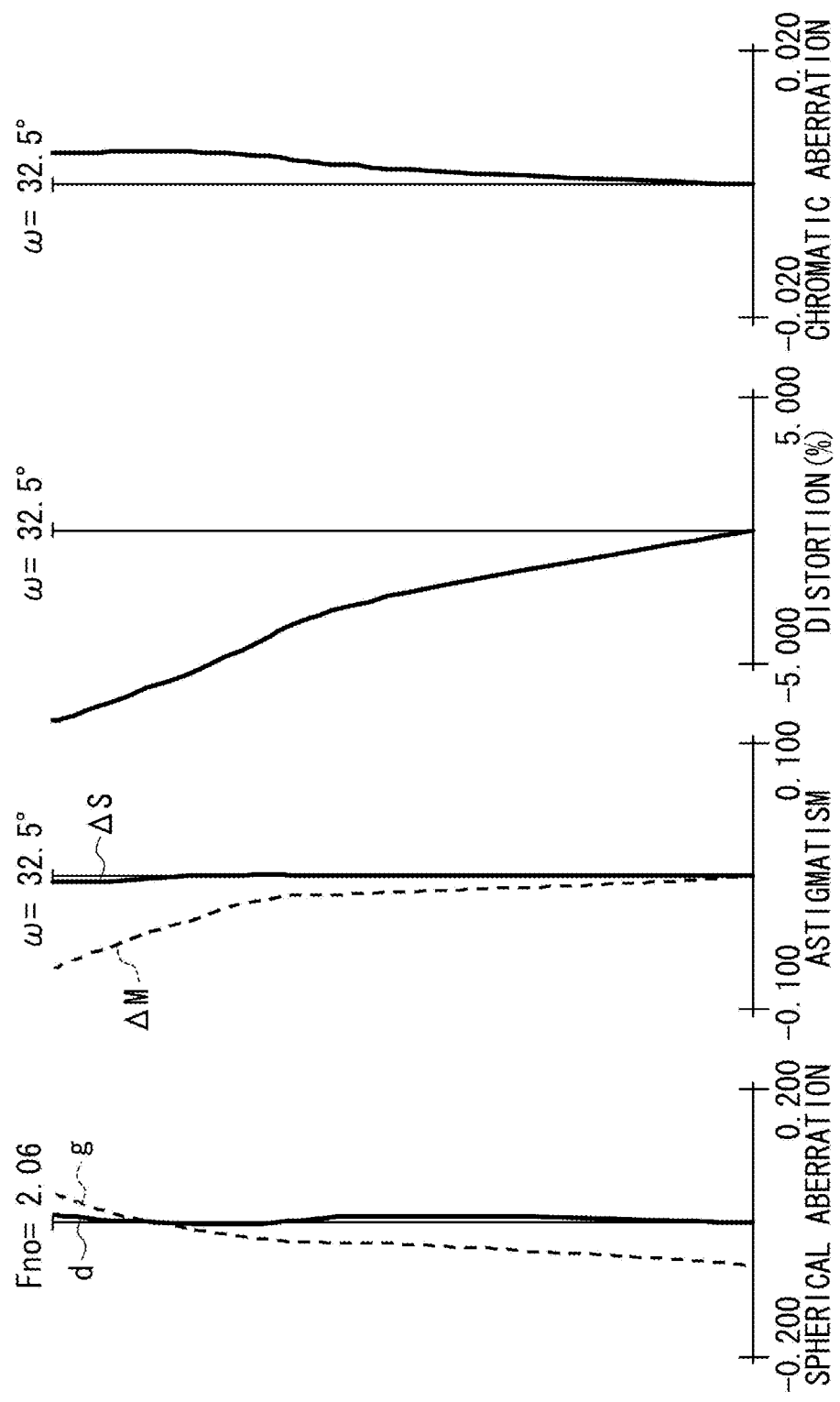

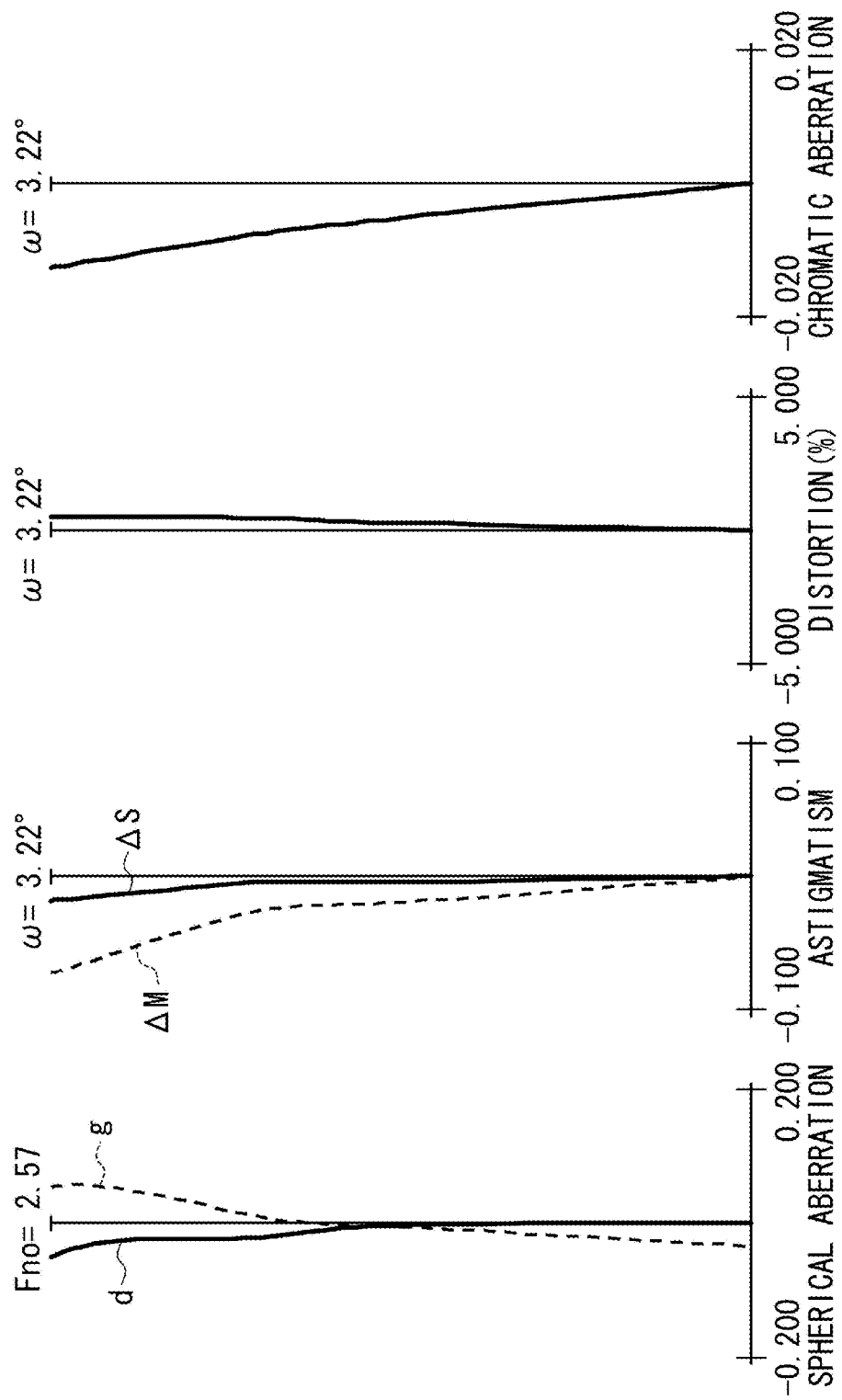

ZOOM LENS AND IMAGE PICKUP APPARATUS EQUIPPED WITH ZOOM LENS

BACKGROUND OF THE INVENTION

1. Field of the Invention

The present invention relates to a zoom lens, and more particularly, to a zoom photographic lens suitable for use in an image pickup apparatus such as a video camera, a monitoring camera, a digital still camera, a camera for broadcasting, and a silver-halide film camera.

2. Description of the Related Art

In an image pickup apparatus such as a video camera, a monitoring camera, and a digital still camera based on a solid-state image sensor, it is desirable a zoom lens having a wide angle of view and a high zoom ratio over the entire zoom range. In addition, as a high-definition quality of solid-state image sensors increases, the zoom lens is demanded to have high optical performance accordingly.

A four-unit zoom lens including first to fourth lens units having positive, negative, positive, and positive refractive powers in order from an object side to an image side is currently known. In a rear focus type zoom lens in which magnification is varied by moving the second lens unit, and a variation of the image plane caused by the variation of magnification is corrected and focusing is performed by moving the fourth lens unit.

In order to obtain a high zoom ratio as well as miniaturization of the entire zoom lens, it is desirable to increase the refractive power of each lens unit of the zoom lens. However, if the refractive power of each lens unit increases, a variation of aberration caused by zooming also increases. Therefore, it is difficult to obtain excellent optical performance over the entire zoom range.

In addition, as the zoom ratio increases, chromatic aberration or curvature of field increases over the entire zoom range from the wide-angle end to the telephoto end. Thus, it is difficult to appropriately correct chromatic aberration or field curvature over the entire zoom range. In order to miniaturize the entire zoom lens with a wide angle of view and a high zoom ratio in the rear focus type four-unit zoom lens described above, it is important to appropriately arrange the refractive power of each lens unit and a lens configuration of the first and second lens units. If such a configuration is not appropriate, variations of various aberrations caused by zooming significantly increase, so that it is difficult to obtain miniaturization of the entire zoom lens with a predetermined zoom ratio and a high optical performance.

SUMMARY OF THE INVENTION

Aspects of the present invention are directed to embodiments of a zoom lens having excellent optical performance over the entire zoom range with a wide angle of view and a high zoom ratio. An image pickup apparatus equipped with the zoom lens is also disclosed.

According to an aspect of the present invention, a zoom lens includes, in order from an object side to an image side, a first lens unit having a positive refractive power, a second lens unit having a negative refractive power, a third lens unit having a positive refractive power, and a fourth lens unit having a positive refractive power, wherein the second and fourth lens units move during zooming, the first and third lens units do not move for zooming, and the following conditions are satisfied:

$$12.0 < f1/fw < 28.0$$
$$-0.265 < f2/\sqrt{(fw \cdot ft)} < -0.20$$
$$5.9 < f4/fw < 12.0$$

where fw denotes a focal length of the entire zoom lens at a wide-angle end, ft denotes a focal length of the entire zoom lens at a telephoto end, f1 denotes a focal length of the first lens unit, f2 denotes a focal length of the second lens unit, and f4 denotes a focal length of the fourth lens unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a cross-sectional view illustrating a zoom lens at a wide-angle end according to a first exemplary embodiment of the invention.

FIGS. 6A, 6B, and 6C are aberration diagrams at the wide-angle end, the middle zoom position, and the telephoto end of the zoom lens according to the third exemplary embodiment.

FIG. 7 is a cross-sectional view illustrating a zoom lens at a wide-angle end according to a fourth exemplary embodiment of the invention.

FIGS. 8A, 8B, and 8C are aberration diagrams at the wide-angle end, the middle zoom position, and the telephoto end of the zoom lens according to the fourth exemplary embodiment.

DESCRIPTION OF THE EMBODIMENTS

Various exemplary embodiments, features, and aspects of the invention will be described in detail below with reference to the drawings.

A zoom lens according to an exemplary embodiment of the invention is a four-unit zoom lens including a first lens unit having a positive refractive power, a second lens unit having a negative refractive power, a third lens unit having a positive refractive power, and a fourth lens unit having a positive refractive power in order from an object side to an image side. The second and fourth lens units move during zooming, and the fourth lens unit moves during focusing. For zooming, the first and third lens units do not move. A lens unit having a refractive power such as a converter lens (not shown) may be arranged in at least one of the object side of the first lens unit or the image side of the fourth lens unit.

Figure 2A:
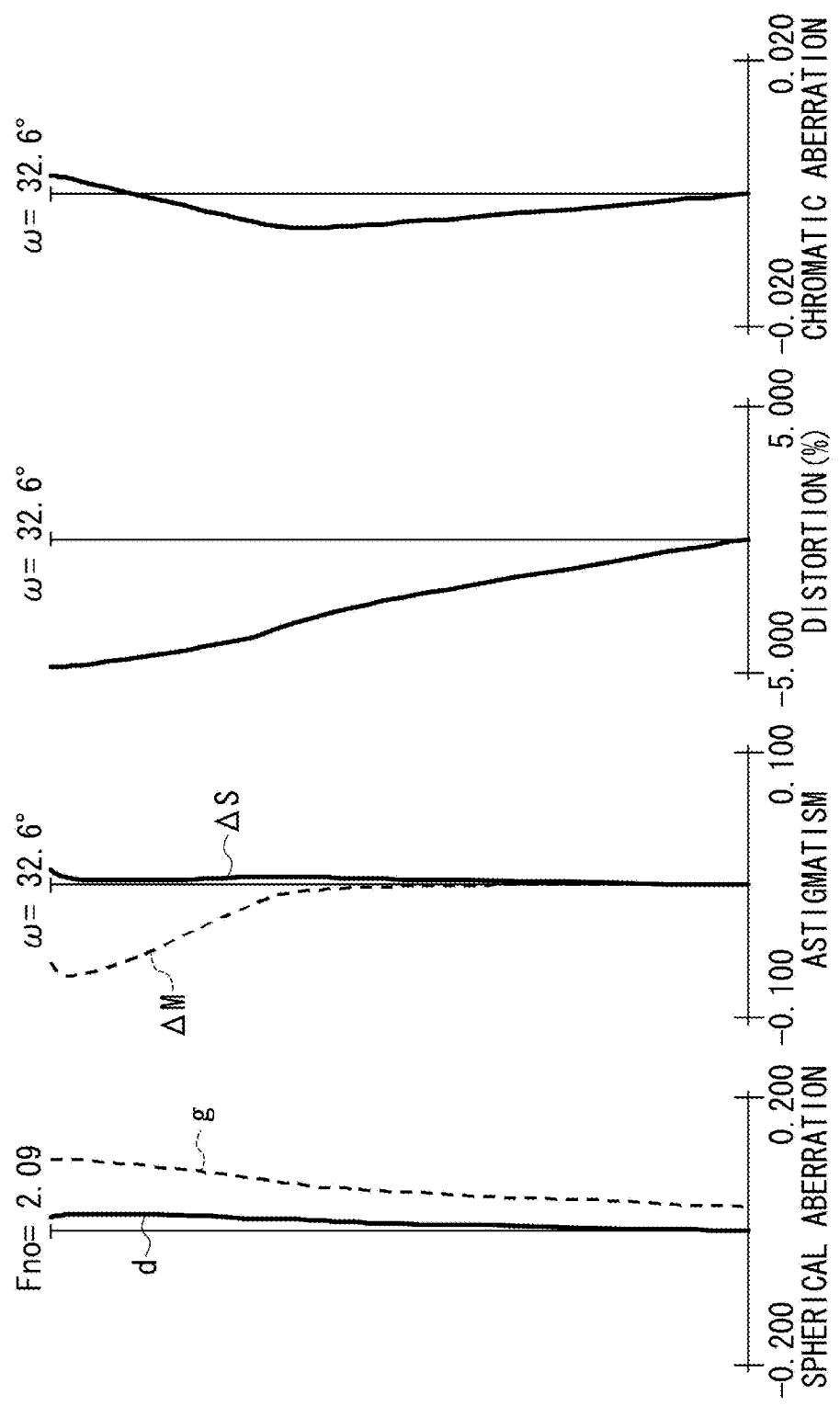
FIGS. 2A, 2B, and 2C are aberration diagrams at the wide-angle end, the middle zoom position, and the telephoto end of the zoom lens according to the first exemplary embodiment.
Figure 2B:
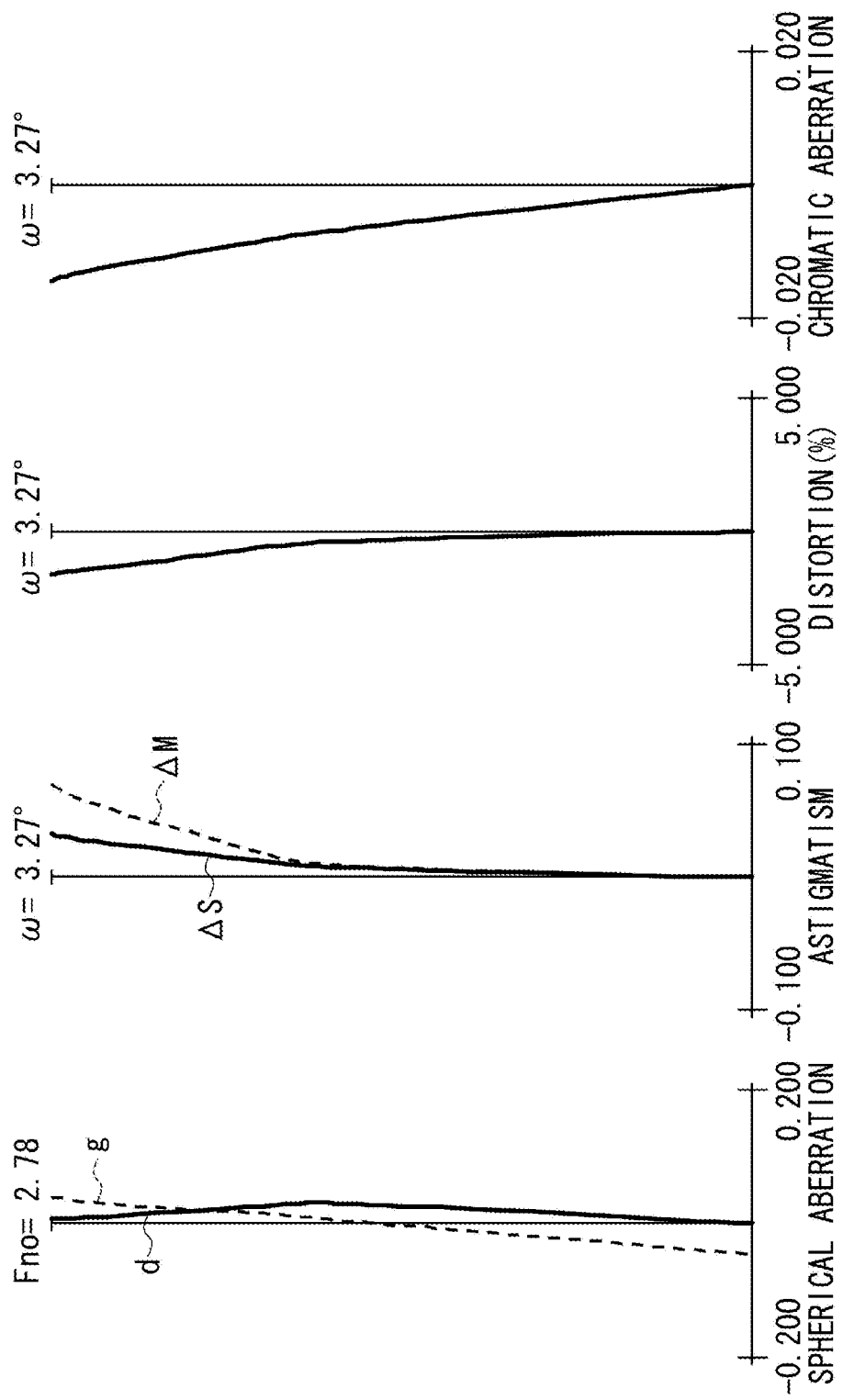
Figure 2C:
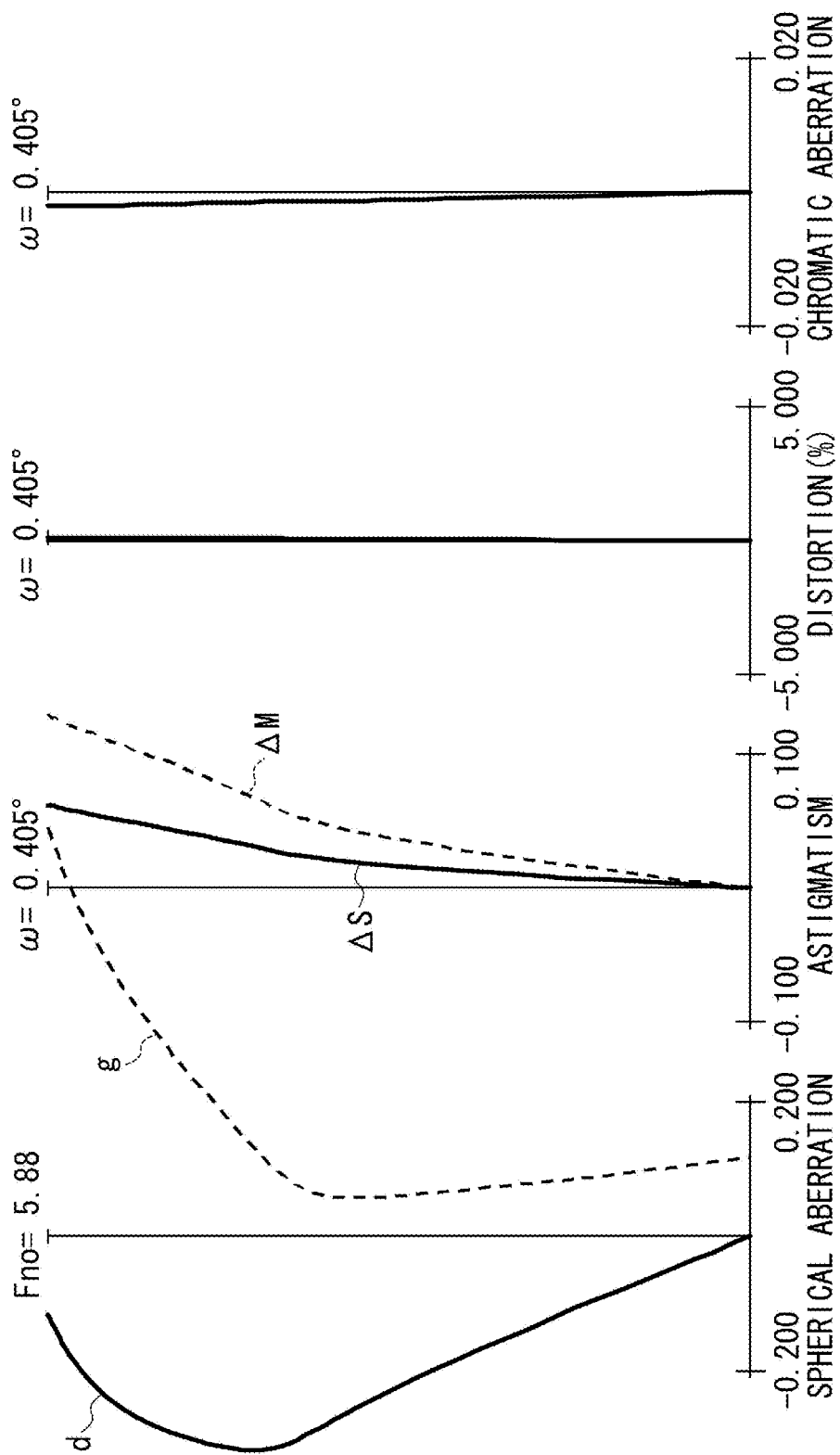
Figure 3:
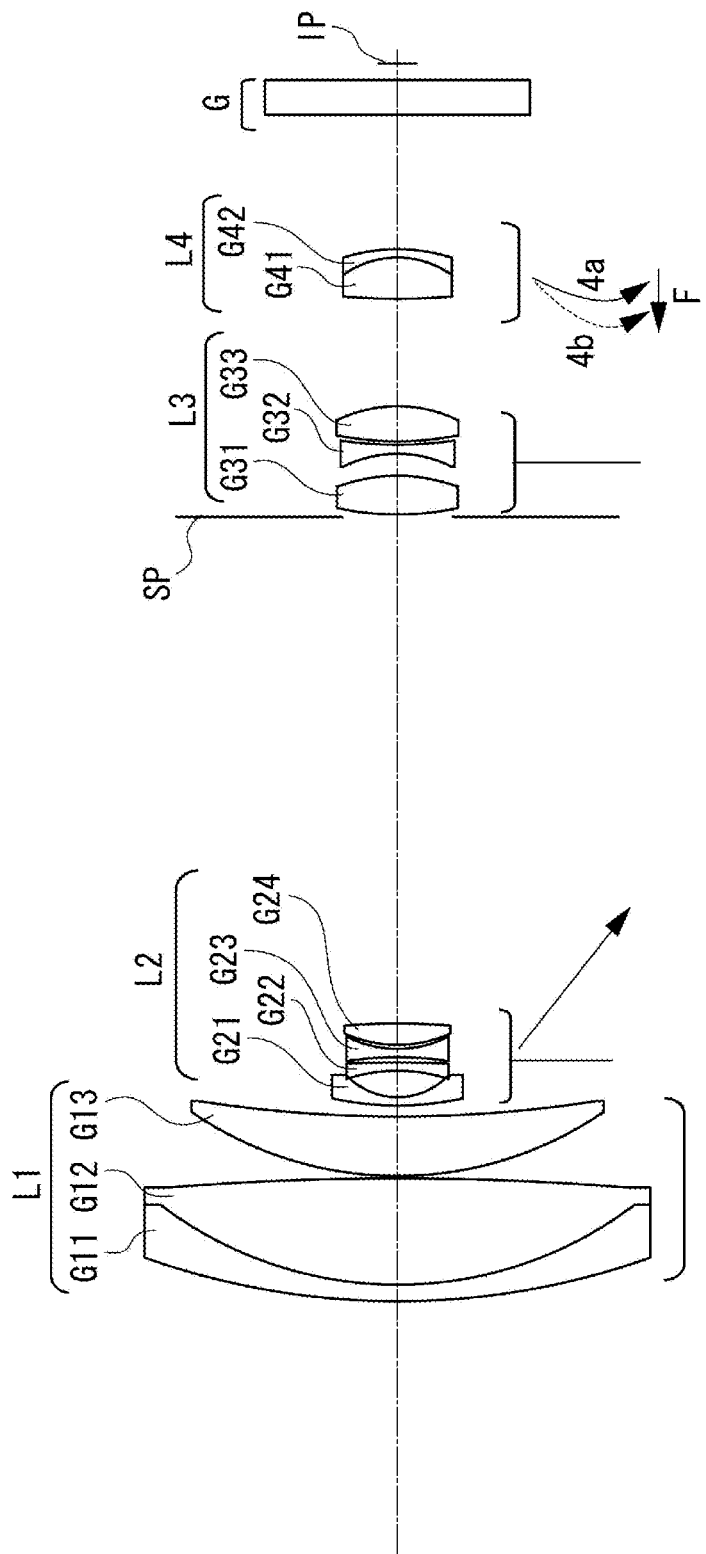
FIG. 3 is a cross-sectional view illustrating a zoom lens at a wide-angle end according to a second exemplary embodiment of the invention.
Figure 4A:
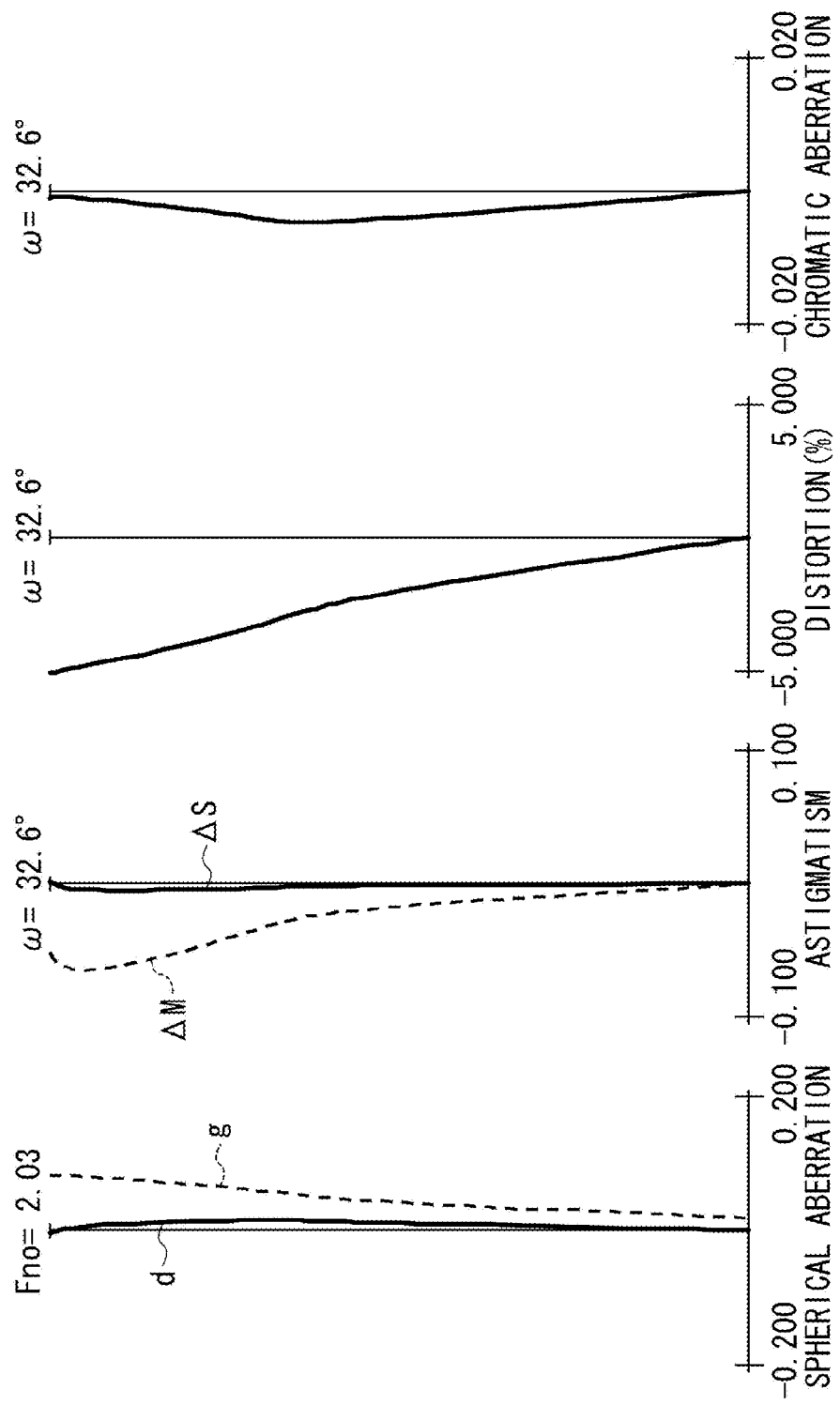
FIGS. 4A, 4B, and 4C are aberration diagrams at the wide-angle end, the middle zoom position, and the telephoto end of the zoom lens according to the second exemplary embodiment.
Figure 4B:
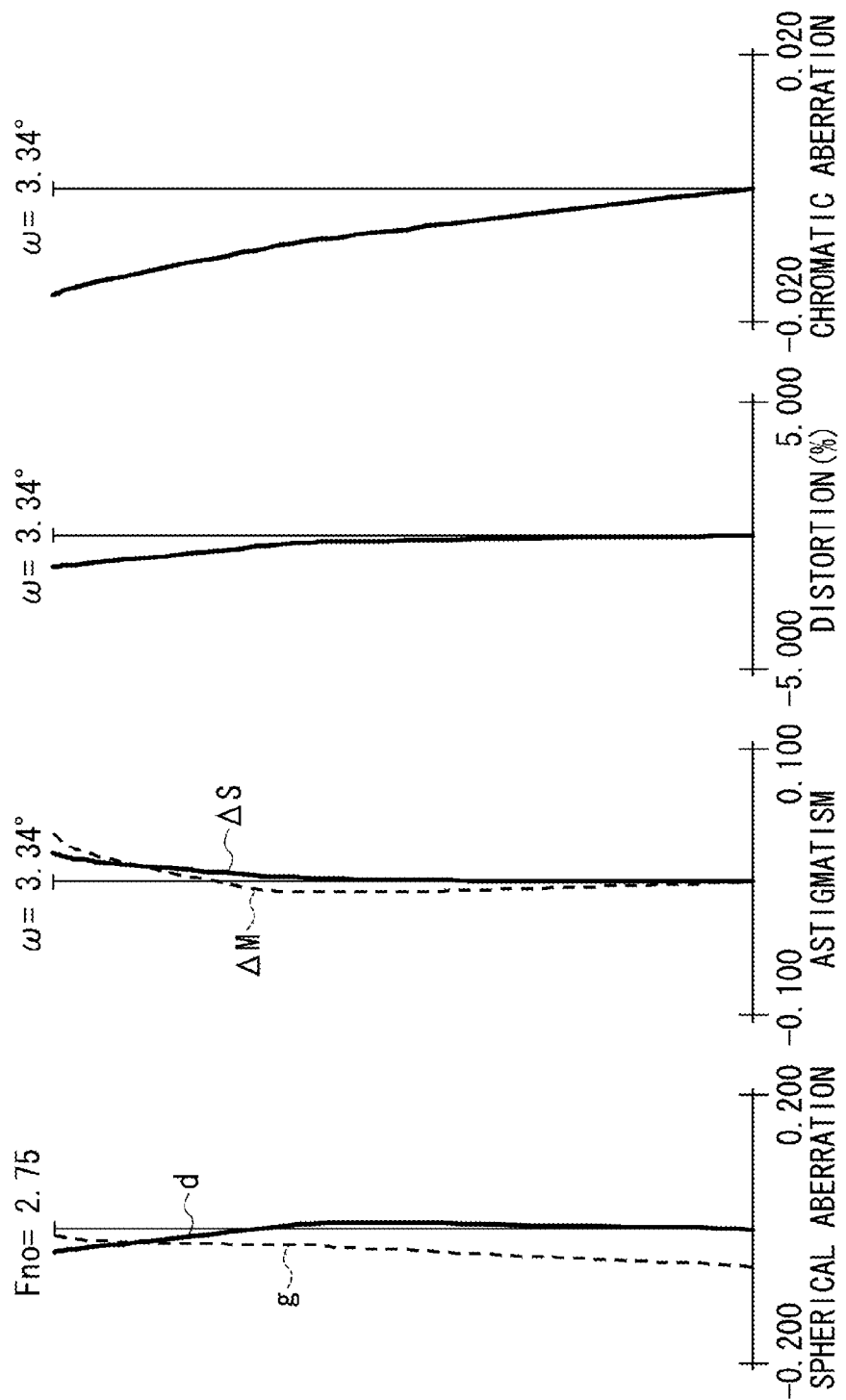
Figure 4C:
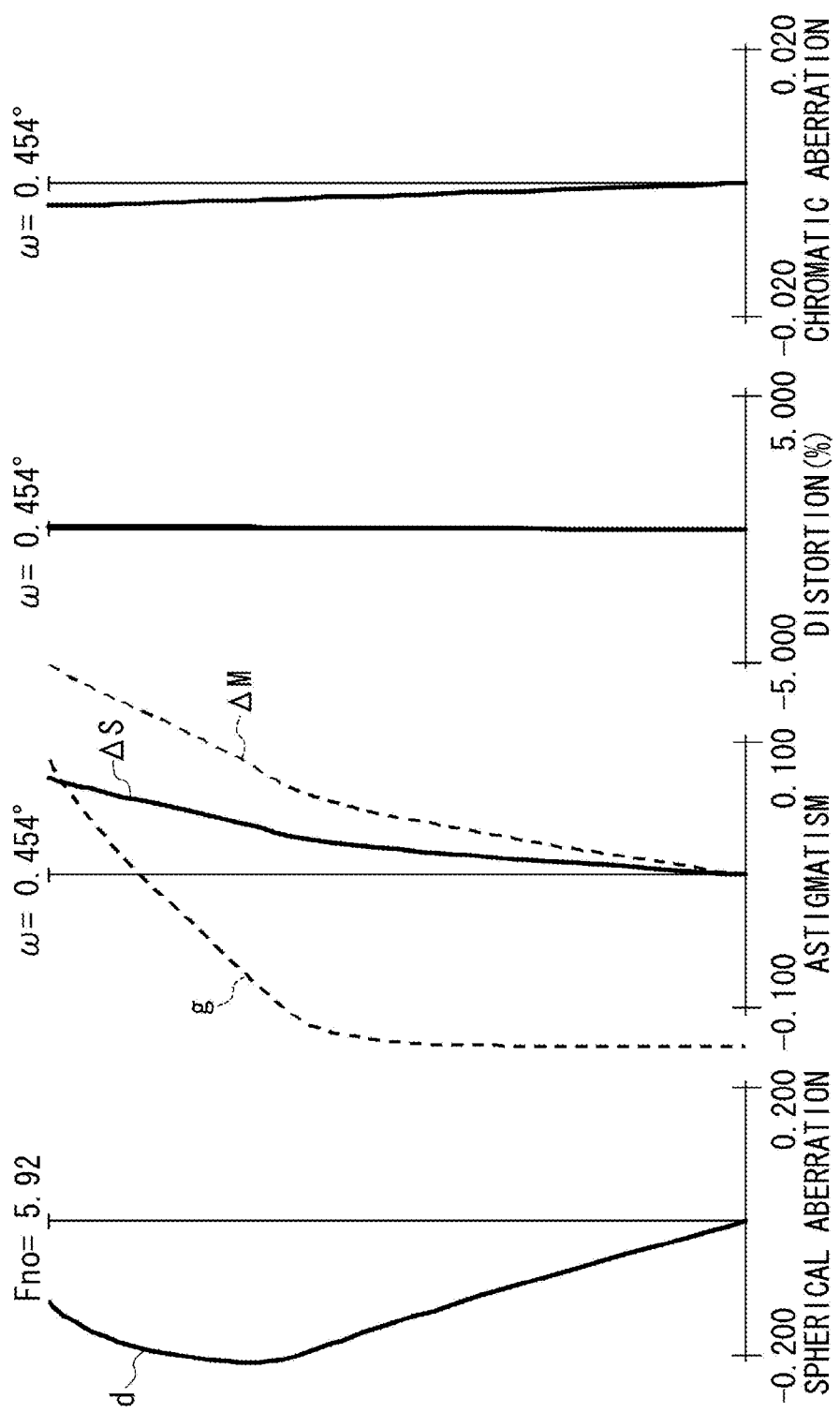
Figure 5:
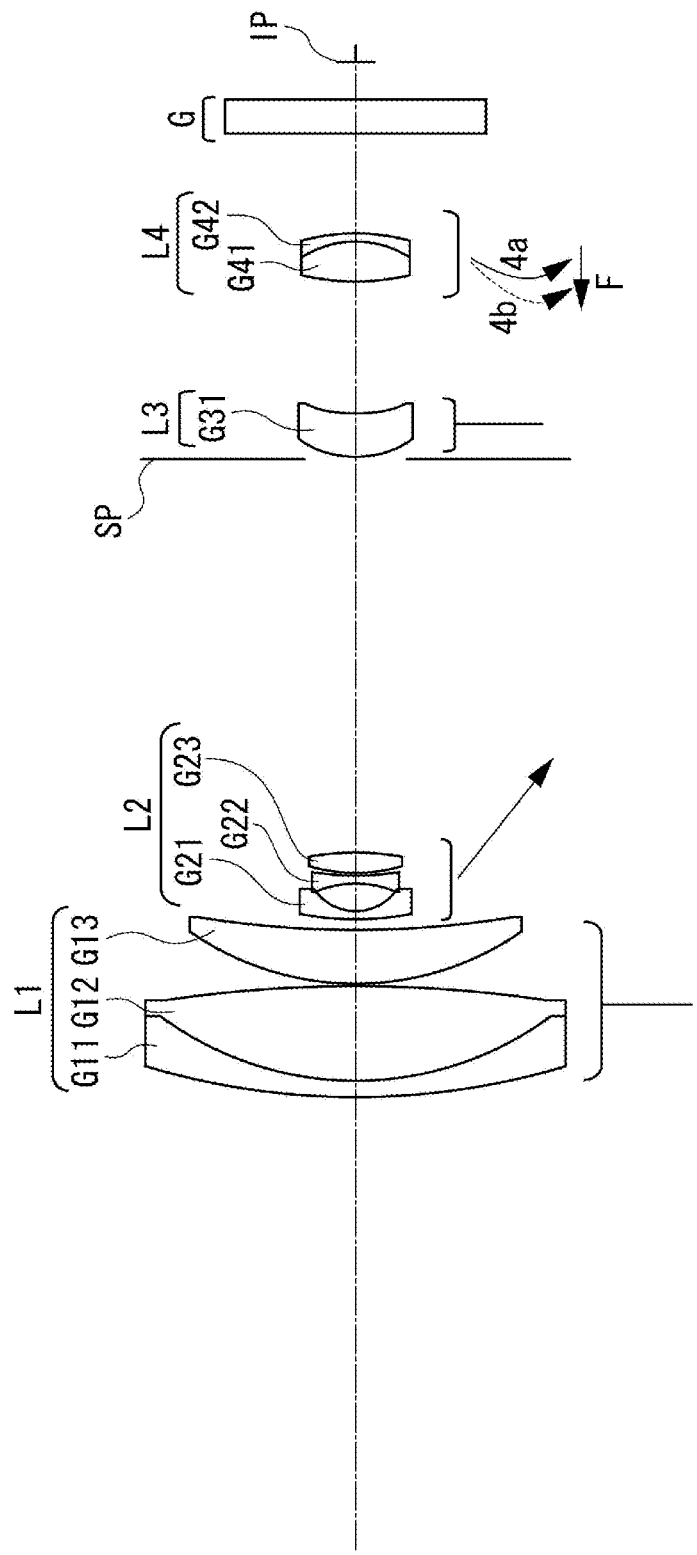
FIG. 5 is a cross-sectional view illustrating a zoom lens at a wide-angle end according to a third exemplary embodiment of the invention.
Figure 6A:
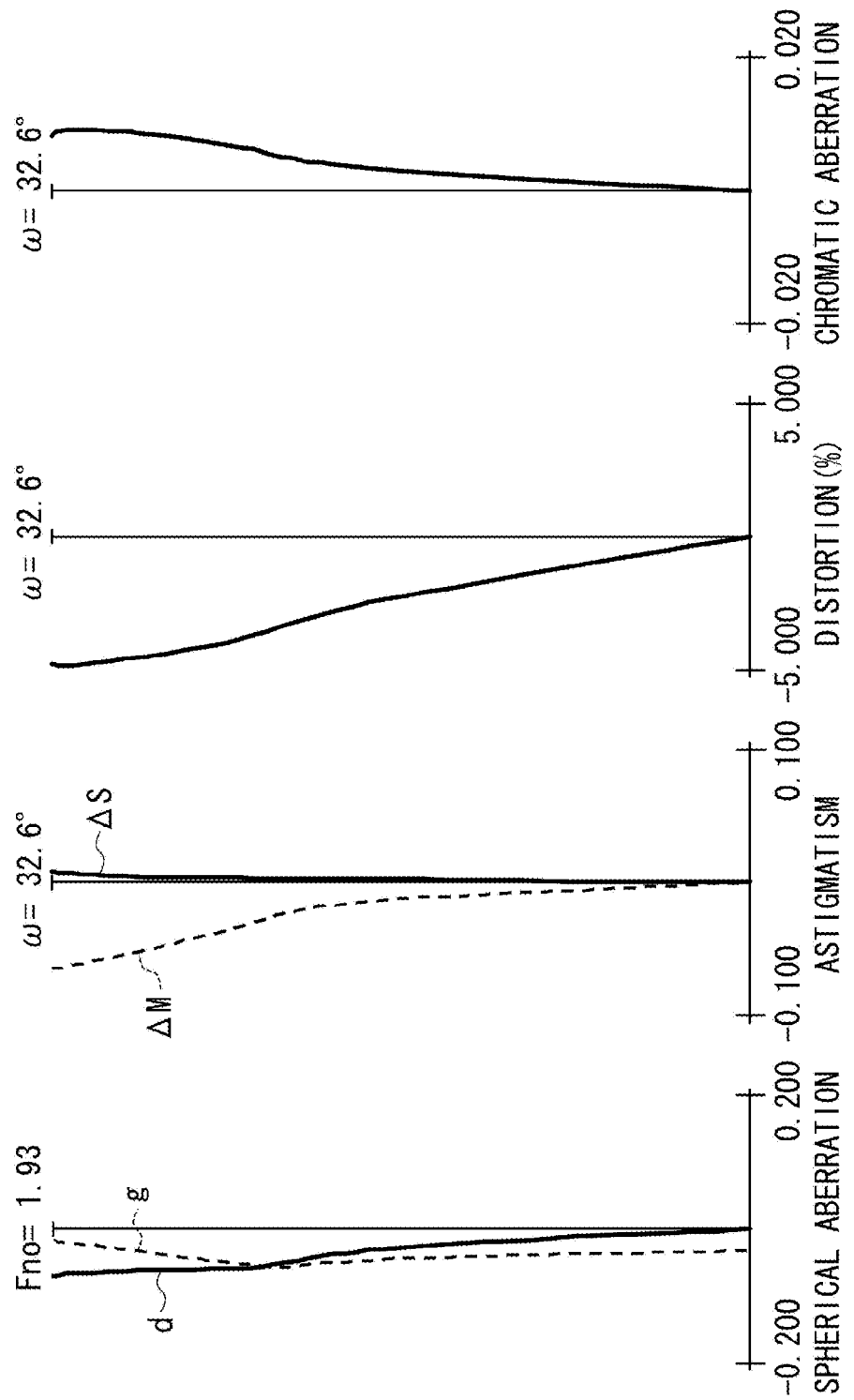

FIG. 1 is a cross-sectional view illustrating a zoom lens at the wide-angle end (short focal length end) according to a first exemplary embodiment of the invention. FIGS. 2A, 2B, and 2C are aberration diagrams at the wide-angle end, the middle zoom position, and the telephoto end (long focal length end), respectively, of the zoom lens according to the first exemplary embodiment. FIG. 3 is a cross-sectional view illustrating a zoom lens at the wide-angle end according to a second exemplary embodiment of the invention. FIGS. 4A, 4B, and 4C are aberration diagrams at the wide-angle end, the middle zoom position, and the telephoto end, respectively, of the zoom lens according to the second exemplary embodiment. FIG. 5 is a cross-sectional view illustrating a zoom lens at the wide-angle end according to a third exemplary embodiment of the invention. FIGS. 6A, 6B, and 6C are aberration diagrams at the wide-angle end, the middle zoom position, and the telephoto end, respectively, of the zoom lens according to the third exemplary embodiment.

Figure 8C:
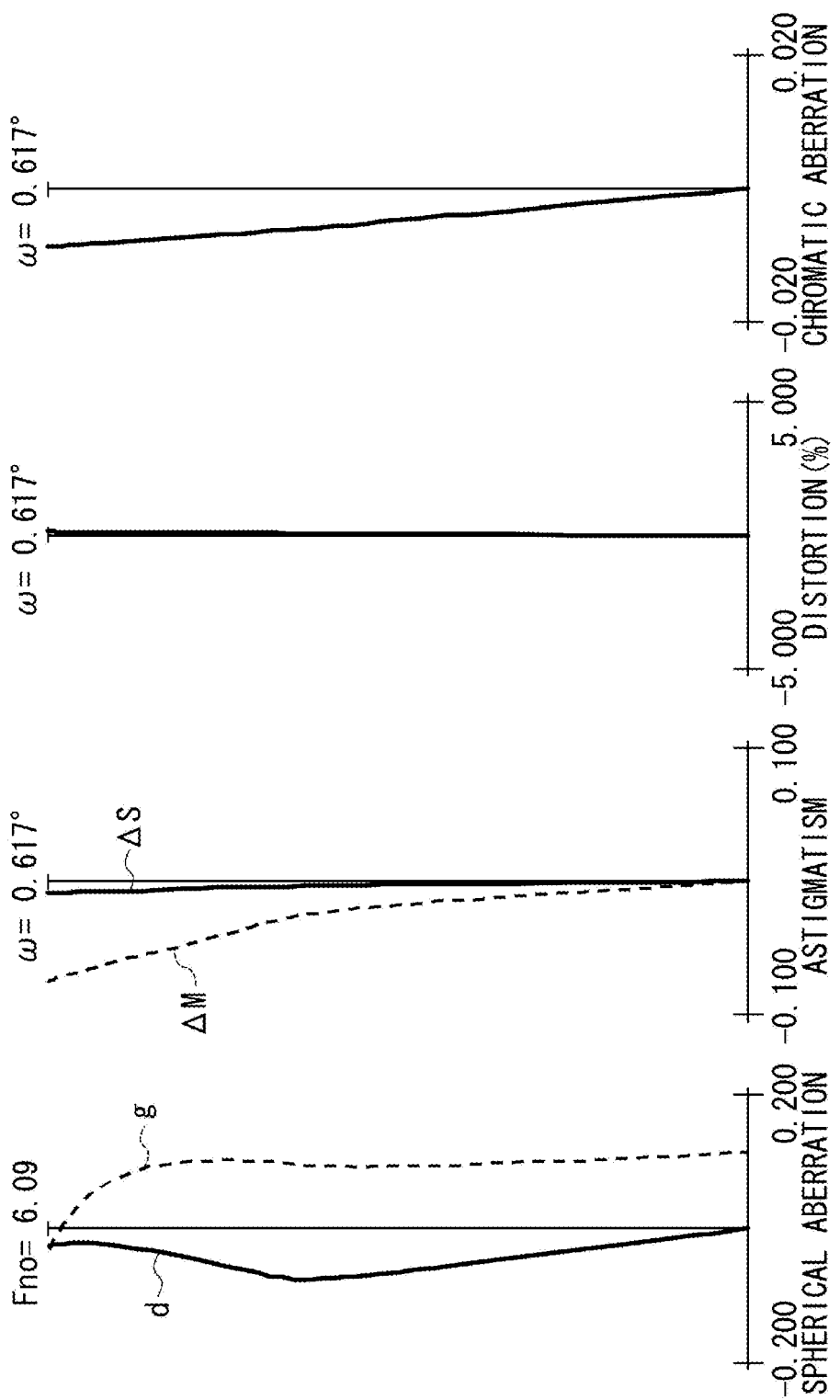
Figure 9:
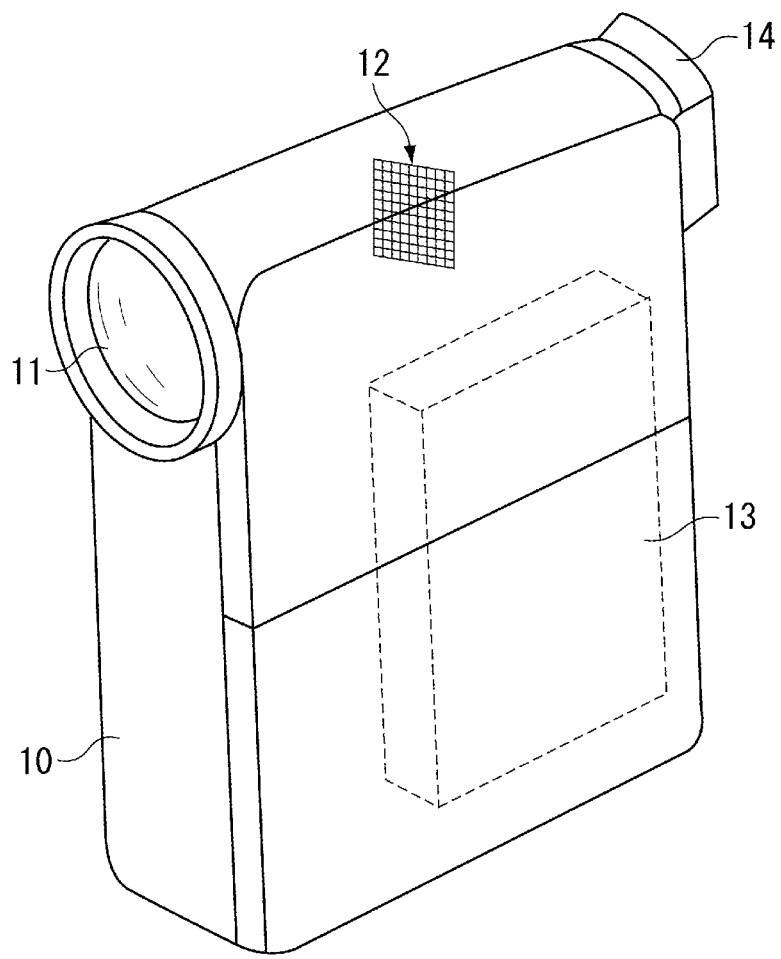
FIG. 9 is a schematic diagram illustrating main parts when the zoom lens according to an exemplary embodiment of invention is applied to a video camera.

FIG. 7 is a cross-sectional view illustrating a zoom lens at the wide-angle end according to a fourth exemplary embodiment of the invention. FIGS. 8A, 8B, and 8C are aberration diagrams at the wide-angle end, the middle zoom position, and the telephoto end, respectively, of the zoom lens according to the fourth exemplary embodiment. FIG. 9 is a schematic diagram illustrating main parts when the zoom lens according to an exemplary embodiment of invention is applied to a video camera (an image pickup apparatus). The zoom lens according to each exemplary embodiment is a photographic lens system used in an image pickup apparatus such as a video camera, a digital camera, and a monitoring camera. In the cross sections of the lens, it is assumed that the left side is an object side (front side), and the right side is an image side (rear side).

When the zoom lens according to an exemplary embodiment of the invention is used as a projection lens such as a projector, the left side is a screen, and the right side is a projection target image. In the lens cross sections of the first to fourth exemplary embodiments, L1 denotes a first lens unit having a positive refractive power (optical power=inverse of focal length), L2 denotes a second lens unit having a negative refractive power, L3 denotes a third lens unit having a positive refractive power, and L4 denotes a fourth lens unit having a positive refractive power. In the cross-sectional views of each exemplary embodiment, SP denotes an aperture stop, which is located on the object side of the third lens unit L3.

G denotes an optical block corresponding to an optical filter, a faceplate, and the like. IP denotes an image plane corresponding to an imaging surface of a solid-state image sensor (photoelectric conversion element) such as a charge-coupled device (CCD) sensor or a complementary metal-oxide semiconductor (CMOS) sensor in the case of a photographic optical system of a video camera or a digital camera or an image plane corresponding to a film surface in the case of a photographic optical system of a silver-halide film camera.

For spherical aberration in the aberration diagrams, d and g denotes d-line and g-line, respectively. For astigmatism, ΔM and ΔS denote a meriodinal image plane and a sagittal image plane, respectively. For distortion, d-line is plotted. For chromatic aberration of magnification, the aberration of g-line relative to d-line is plotted. Fno denotes the F-number, and ω denotes a half angle of view. In each of the following exemplary embodiments, the wide-angle end and the telephoto end represent end zoom positions of where a magnification varying lens unit (second lens unit L2) may be located in the respective two ends of a movable range on an optical axis of a mechanism.

In each exemplary embodiment, during zooming from the wide-angle end to the telephoto end, the magnification is varied by moving the second lens unit L2 toward the image side. A variation of the image plane IP caused by the variation of magnification is corrected by moving the fourth lens unit L4 along a locus that is convex toward the object side.

In addition, focusing is performed by moving the fourth lens unit L4 along the optical axis. The solid-lined curve 4a and the dotted-lined curve 4b of the fourth lens unit L4 indicate movement loci for correcting a variation of the image plane during zooming from the wide-angle end to the telephoto end when focusing is made for the infinitely distant object and the closest object, respectively. In addition, when focusing is made to the closest object from the infinitely distant object in the zoom position of the telephoto end, the fourth lens unit L4 is moved forward as indicated by the arrow F.

Although the first lens unit L1, the third lens unit L3, and the aperture stop SP do not move for zooming and focusing in the first to fourth exemplary embodiments, they may move as necessary. In each exemplary embodiment, the focal length of the entire zoom lens at the wide-angle end is denoted by fw, and the focal length of the entire zoom lens at the telephoto end is denoted by ft. In addition, the focal length of the first lens unit L1 is denoted by f1, the focal length of the second lens unit L2 is denoted by f2, and the focal length of the fourth lens unit L4 is denoted by f4. In this case, the following conditions are satisfied:

$$12.0 < f1/fw < 28.0 \quad (1)$$

$$-0.265 < f2/\sqrt{(fw \cdot ft)} < -0.20 \quad (2)$$

$$5.9 < f4/fw < 12.0 \quad (3)$$

The conditions (1) to (3) are set for obtaining excellent optical performance over the entire zoom range with a wide angle of view and a high zoom ratio. The condition (1) relates to a refractive power of the first lens unit L1. If the focal length of the first lens unit L1 increases with the upper limit of the condition (1) exceeded, the load of the positive refractive power of the first lens unit L1 is alleviated. Therefore, this is advantageous from the viewpoint of aberration correction, but the total lens length or the front lens effective diameter increases. On the contrary, if the focal length of the first lens unit L1 decreases with the lower limit of the condition (1) exceeded, it is difficult to correct various aberrations including spherical aberration at the telephoto end.

The condition (2) relates to a power of the second lens unit, which is a lens unit for varying magnification. As the focal length of the second lens unit L2 increases with the upper limit of the condition (2) exceeded, the movement amount of the second lens unit L2 increases to obtain a desired zoom ratio, and the total lens length and the front lens effective diameter increase. On the contrary, if the focal length of the second lens unit L2 decreases with the lower limit of the condition (2) exceeded, this is advantageous from the viewpoint of miniaturization of the entire lens system, but it is difficult to correct various aberrations.

The condition (3) relates to a power of the fourth lens unit L4, which is a lens unit movable during zooming. If the focal length of the fourth lens unit L4 increases with the upper limit of the condition (3) exceeded, the power of the fourth lens unit L4 is weakened, and the movement amount for zooming and focusing increases, so that it is difficult to miniaturize of the entire zoom lens. If the focal length of the fourth lens unit L4 decreases with the lower limit of the condition (3) exceeded, the power of the fourth lens unit L4 significantly increases, and it is difficult to correct various aberrations. More usefully, the numerical ranges of the conditions (1) to (3) may be set as follows:

$$13.0 < f1/fw < 26.0 \quad (1a)$$

$$-0.255 < f2/\sqrt{(fw \cdot ft)} < -0.21 \quad (2a)$$

$$6.1 < f4/fw < 11.0 \quad (3a)$$

As a result, in each exemplary embodiment, it is possible to obtain a zoom lens having an excellent optical performance while the entire zoom lens is miniaturized with a wide angle of view and a high zoom ratio, and various aberrations are appropriately corrected in the entire zoom range.

The zoom lens according to an exemplary embodiment of the invention is implemented by satisfying the configurations described above. However, in order to maintain an excellent optical performance with a high zoom ratio, it is useful that at least one of the following conditions be satisfied. The average refractive index in d-line of a material of negative lenses included in the second lens unit L2 is denoted by N2a. The focal length of the third lens unit L3 is denoted by f3. The Abbe number and the relative partial dispersion of a material of at least one of positive lenses included in the first lens unit L1 are denoted by vdp and θgFp, respectively. The movement amount M2 of the second lens unit L2 for zooming from the wide-angle end to the telephoto end is denoted by M2.

Here, the sign of the movement amount M2 is set to positive when the second lens unit L2 is positioned on the image side at the telephoto end relative to the wide-angle end with respect to the image plane and is set to negative when the second lens unit L2 is positioned on the object side. In addition, the Abbe number vdp and the relative partial dispersion θgFp are set as follows.

Here, nd denotes a refractive index for d-line (587.56 nm), ng denotes a refractive index for g-line (435.84 nm), nF denotes a refractive index for F-line (486.13 nm), and nC denotes a refractive index the C-line (656.28 nm).

In this case, the Abbe number vdp and the relative partial dispersion θgFp are defined as follows:

$$vdp = (nd-1)/(nF-nC)$$

$$\theta gFp = (ng-nF)/(nF-nC)$$

At least one of the following conditions is satisfied:

$$1.80 < N2a < 2.05 \quad (4)$$

$$9.0 < f3/fw < 17.0 \quad (5)$$

$$70 < vdp \quad (6)$$

$$0.004 < \theta gFp - (0.644 - 0.00168 \cdot vdp) < 0.060 \quad (7)$$

$$0.15 < M2/ft < 0.23 \quad (8)$$

The condition (4) relates to a refractive index of a material of a negative lens included in the second lens unit L2. If the average refractive index N2a of the negative lenses increases with the upper limit of the condition (4) exceeded, it becomes easy to strengthen the power of the second lens unit L2, and the movement amount during zooming is reduced. Therefore, it is advantageous from the viewpoint of miniaturization of the entire zoom lens. However, since the Abbe number in the selection of a material tends to be reduced, it is difficult to correct chromatic aberration. On the contrary, if the average refractive index N2a of the negative lenses decreases with the lower limit of the condition (4) exceeded, it is necessary to increase the curvature of the lens surface of each lens, and it is difficult to obtain balancing of various aberrations. More usefully, the condition (4) may be set as follows:

$$1.86 < N2a < 1.98 \quad (4a)$$

The condition (5) relates to a power of the third lens unit L3. If the focal length of the third lens unit L3 increases with the upper limit of the condition (5) exceeded, the load of the positive refractive power of the third lens unit L3 is reduced, and the aberration correction becomes easy. However, the total lens length increases. For this reason, it is necessary to increase the power of the fourth lens unit L4. Then, it is difficult to suppress variations of various aberrations over the entire zoom range. In addition, since the lens diameter of the fourth lens unit L4 increases, it is difficult to miniaturize the entire zoom lens. Furthermore, the driving load of an actuator used in focusing by the fourth lens unit L4 increases.

If the focal length of the third lens unit L3 decreases with the lower limit of the condition (5) exceeded, the power of the third lens unit L3 significantly increases, and it is difficult to correct various aberrations (particularly, correction of spherical aberration at the wide-angle end). In addition, a variation of the position of the exit pupil caused by the change of the position of the fourth lens unit L4 increases. More usefully, the numerical range of the condition (5) is set as follows:

$$10.5 < f3/fw < 15.5 \quad (5a)$$

The conditions (6) and (7) are provided for appropriately correcting chromatic aberration (particularly, axial chromatic aberration in the telephoto range). If both the conditions (6) and (7) are satisfied, a characteristic of a material capable of anomalous dispersion or low dispersion (or ultra-low dispersion) can be effectively used. Therefore, it is possible to appropriately correct chromatic aberration. If the conditions (6) and (7) are not satisfied, the correction of chromatic aberration becomes insufficient, and color blurring occurs in the image.

More usefully, the numerical range of the conditions (6) and (7) are set as follows:

$$75 < vdp \quad (6a)$$

$$0.020 < \theta gFp - (0.644 - 0.00168 \cdot vdp) < 0.055 \quad (7a)$$

The condition (8) relates to a movement amount during zooming of the second lens unit L2 with respect to the focal length of the telephoto end. If the value M2/ft increases with the upper limit of the condition (8) exceeded, the movement amount of the second lens unit L2 significantly increases, and it is difficult to miniaturize the entire zoom lens. If the value M2/ft decreases with the lower limit of the condition (8) exceeded, the movement amount of the second lens unit L2 significantly decreases. Therefore, although this is advantageous from the viewpoint of miniaturization of the entire zoom lens, it is necessary to increase the power of the second lens unit L2. Since the Petzval sum increases in a negative direction accordingly, it is difficult to correct curvature of field.

More usefully, the numerical range of the condition (8) is set as follows:

$$0.16 < M2/ft < 0.22 \quad (8a)$$

In each exemplary embodiment, usefully, at least one of the following configurations is implemented. The third lens unit L3 can include at least one positive lens having an aspheric shape. This is advantageous to appropriately correct curvature of field in the entire zoom range from the wide-angle end to the telephoto end, while this facilitates correction of spherical aberration and axial chromatic aberration. If an aspheric surface is provided in the third lens unit L3, it is possible to facilitate correction of various aberrations. If various aberrations are corrected by increasing the number of lenses without using an aspheric surface, it may be difficult to miniaturize the entire zoom lens.

Since the fourth lens unit L4 is used to correct a variation of the image plane during focusing and variation of magnification, the fourth lens unit L4 can be a cemented lens obtained by cementing positive and negative lenses. If the fourth lens unit L4 is a cemented lens including positive and negative lenses, it is possible to effectively and easily correct chromatic aberration during zooming from the wide-angle end to the telephoto end and during focusing from the closest object to the infinitely distant object.

In an image pickup apparatus using the zoom lens according to an exemplary embodiment of the invention, distortion of an image formed by the image pickup apparatus may be corrected using an electric correction unit. When the image pickup apparatus according to an exemplary embodiment of the invention is employed in a digital camera and the like different from an image pickup apparatus using silver-halide film, various aberrations may be alleviated by applying image conversion processing to the image obtained from the zoom lens based on the characteristic that digital data is obtained from the image.

For example, if an image processing is used to correct distortion or chromatic aberration, it is possible to correct various aberrations effectively. In this image processing, it is possible to obtain excellent optical performance with few aspheric surfaces or anomalous dispersion glasses. The zoom lens according to an exemplary embodiment of the invention may be employed in an image pickup apparatus having a solid-state image sensor, which receives light of the formed image. In order to process an image digitally, a CCD sensor, a CMOS sensor, and the like are mainly employed in the image pickup apparatus. The invention can be applied to an image pickup apparatus having such a solid-state image sensor.

Next, a lens configuration of each exemplary embodiment will be described. Hereinafter, unless specified otherwise, description of the lens configuration will be made in order from the object side to the image side. According to the first exemplary embodiment, the first lens unit L1 includes a negative lens G11 having a meniscus shape in which the object side surface is convex, a positive lens G12 having a biconvex shape, and a positive lens G13 having a meniscus shape in which the object side surface is convex. The positive lens G12 is made of a material having a large Abbe number (having an anomalous dispersion characteristic) in order to obtain a chromatic aberration correction effect.

The second lens unit L2 includes a negative lens G21 having a meniscus shape in which the object side surface is convex, a negative lens G22 having a meniscus shape in which the image side surface is convex, a negative lens G23 having a biconcave shape, and a positive lens G24 having a biconvex shape. The negative lens in the second lens unit L2 is made of a high-refractive material in order to reduce a movement amount during zooming, if possible, considering a fact that it also serves as a magnification varying lens unit. In addition, in order to suppress occurrence of chromatic aberration, the negative lens in the second lens unit L2 is made of a low-dispersion material, if possible.

The third lens unit L3 includes an aperture stop SP, a positive lens G31 having a biconvex shape, a negative lens G32 having a biconcave shape, and a positive lens G33 having a biconvex shape. In this case, both surfaces of the positive lens G31 and the image side surface of the positive lens G33 have an aspheric shape. As a result, it is possible to effectively correct various aberrations over the entire zoom range, including spherical aberration at the wide-angle end. In addition, as a diameter of the light beam divergent from the third lens unit L3 increases, the size of the fourth lens unit L4 increases. Therefore, the third lens unit L3 is configured such that a light beam exiting the third lens unit L3 has a reduced diameter.

The fourth lens unit L4 is a cemented lens obtained by cementing a positive lens G41 having a biconvex shape and a negative lens G42 having a meniscus shape in which the image side surface is convex. If the cemented lens is employed, it is possible to appropriately correct axial chromatic aberration and chromatic aberration of magnification over the entire zoom range. In addition, if the object side surface of the positive lens G41 has an aspheric shape, it is possible to correct a variation of the image plane caused by the variation of magnification and to correct various aberrations occurring from the fourth lens unit L4, which moves for focusing. Particularly, if the aspheric surface is used, it is possible to effectively correct various aberrations over the entire zoom position from the wide-angle end to the telephoto end and during focusing from the infinitely distant object to the closest object, without increasing the number of lens elements The second exemplary embodiment will be described. The first, second, and fourth lens units L1, L2, and L4 are similar to those of the first exemplary embodiment. The second exemplary embodiment is different from the first exemplary embodiment only in that both surfaces of the positive lens G31 of the third lens unit L3 have an aspheric shape.

The third exemplary embodiment will be described. The first lens unit L1 is similar to that of the first exemplary embodiment. The second lens unit L2 includes a negative lens G21 having a meniscus shape in which the object side surface is convex, a negative lens G22 having a biconcave shape, and a positive lens G23 having a biconvex shape. The third lens unit L3 includes an aperture stop SP and a positive lens G31 having a meniscus shape in which the object side surface is convex. In this case, both surfaces of the positive lens G31 have an aspheric shape. The fourth lens unit L4 is similar to that of the first exemplary embodiment.

The fourth exemplary embodiment will be described. The first lens unit L1 is similar to that of the first exemplary embodiment. The second lens unit L2 includes a negative lens G21 having a meniscus shape in which the object side surface is convex, a negative lens G22 having a biconcave shape, and a cemented lens obtained by cementing a positive lens G23 having a biconvex shape and a negative lens G24 having a biconcave shape.

The third lens unit L3 includes an aperture stop SP and a positive lens G31 having a meniscus shape in which the object side surface is convex. Both surfaces of the positive lens G31 have an aspheric shape. The fourth lens unit L4 is similar to that of the first exemplary embodiment. In the first to fourth exemplary embodiments, the positive lens G12 is made of anomalous dispersion glass such as a product name S-FPL51 (manufactured by OHARA Inc.) or S-FPL53 (manufactured by OHARA Inc.). However, the invention is not limited thereto.

As described above, according to each exemplary embodiment, it is possible to obtain a miniaturized zoom lens capable of obtaining an excellent optical performance over the entire zoom range with a wide angle of view and a high zoom ratio, and to obtain an image pickup apparatus having the zoom lens. In addition, in each exemplary embodiment, the following configuration may be possible.

The shape of glass and the number of lenses described in each exemplary embodiment may be suitably changed without limitation. Although the aperture stop SP is set on the object side of the third lens unit L3, the aperture stop SP may be set in other positions without limitation. For example, the aperture stop SP may be positioned in the middle or on the image side of the third lens unit L3. In addition, the aperture stop SP may be moved independently from the other lens units during zooming. The material of the aspheric lens is not limited to glass. A hybrid type aspheric lens in which an aspheric surface is formed (an aspheric component is loaded) on the spherical lens using a resin material or an aspheric lens made of a plastic material may be used. A part of lenses or lens units may be moved to have a component perpendicular to an optical axis so that a variation of the image is corrected when the zoom lens is vibrated due to a camera shake or the like.

Next, numerical examples 1 to 4 corresponding to the first to fourth exemplary embodiments of the invention will be described. In each numerical example, i denotes the order of a surface counting from the object side. ri denotes the radius of curvature of the i-th surface from the object side. di denotes a distance between the i-th surface and the (i+1)th surface from the object side. ni denotes a refractive index of the material of the i-th lens with respect to d-line. vi denotes the Abbe number of the i-th lens with respect to the Fraunhofer d-line.

In addition, in each numerical example, the two image surfaces closest to the image plane correspond to the optical block G. In addition, k denotes a conical constant, A4, A6, A8, and A10 denote fourth-order, sixth-order, eighth-order, and tenth-order aspheric coefficients, respectively, and a displacement in the optical axis direction at the height h from the optical axis with respect to the surface vertex is denoted by x, the aspheric shape is expressed as follows:

$$X=(h^2/R)/[1+[1-(1+K)(h/R)^2]^{1/2}]^3+A4h^4+A6h^6+A8h^8+A10h^{10}$$

where R denotes a radius of curvature. "e-X" means "× $10^{-X}$". In addition, the aspheric surface is given an asterisk mark (*) on the right side of the surface number in each table.

The total lens length is defined as a value obtained by adding a back focus BF (equivalent value in the air) to a distance from the foremost lens surface to the rearmost lens surface. The unit of length is set to "mm". A correspondence relation between the conditions described above and each numerical example is set forth in Table 1.

NUMERICAL EXAMPLE 1

| Surface number | r | d | nd | vd |
|---|---|---|---|---|
| 1 | 42.996 | 1.3 | 1.90366 | 31.3 |
| 2 | 25.978 | 7 | 1.43875 | 95 |
| 3 | −203.074 | 0.15 | | |
| 4 | 24.225 | 3.79 | 1.62041 | 60.3 |
| 5 | 78.072 | (Variable) | | |
| 6 | 16.019 | 0.5 | 2.00069 | 25.5 |
| 7 | 3.823 | 1.84 | | |
| 8 | −6.964 | 0.5 | 1.883 | 40.8 |
| 9 | −40.933 | 0.24 | | |
| 10 | −28.706 | 0.5 | 1.883 | 40.8 |
| 11 | 11.517 | 0.15 | | |
| 12 | 10.783 | 1.38 | 1.92286 | 18.9 |
| 13 | −14.24 | (Variable) | | |
| 14(Stop) | ∞ | 0.15 | | |
| 15* | 22.124 | 2.35 | 1.58313 | 59.4 |
| 16* | −9.529 | 1.7 | | |
| 17 | −8.126 | 0.72 | 1.883 | 40.8 |
| 18 | 16.415 | 0.2 | | |
| 19 | 12.62 | 2.77 | 1.59282 | 68.6 |
| 20* | −8.732 | (Variable) | | |
| 21* | 70.727 | 2.5 | 1.6935 | 53.2 |
| 22 | −5.765 | 0.5 | 1.911 | 35.3 |
| 23 | −10.898 | (Variable) | | |
| 24 | ∞ | 2.1 | 1.51633 | 64.2 |
| Image plane | ∞ | | | |

Aspheric surface data

15th surface

K = −1.03304e+000   A4 = 2.09274e−004   A6 = −4.89471e−006
A8 = −3.89412e−008

16th surface

K = 1.20423e+000   A4 = 7.45080e−004   A6 = −4.91526e−006

20th surface

K = 1.99770e−001   A4 = −4.49548e−005   A6 = 4.02768e−006
A8 = 1.12141e−007

21st surface

K = −1.37839e+002   A4 = −2.75620e−005   A6 = 2.85249e−006
A8 = −4.51252e−008

Various data
Zoom ratio: 90.31

| | Wide-angle | Middle | Telephoto |
|---|---|---|---|
| Focal length | 1.80 | 20.14 | 162.51 |
| F-number | 2.09 | 2.78 | 5.88 |
| Image height | 1.15 | 1.15 | 1.15 |
| Total lens length | 82.40 | 82.40 | 82.40 |
| BF | 10.18 | 16.40 | 4.61 |
| Distance | | | |
| d5 | 0.68 | 27.48 | 34.18 |
| d13 | 35.23 | 8.43 | 1.73 |
| d20 | 7.37 | 1.15 | 12.94 |
| d23 | 8.27 | 14.49 | 2.70 |

NUMERICAL EXAMPLE 2

| Surface number | r | d | nd | vd |
|---|---|---|---|---|
| 1 | 45.294 | 1 | 1.90366 | 31.3 |
| 2 | 23.531 | 6.44 | 1.497 | 81.5 |
| 3 | −174.893 | 0.15 | | |
| 4 | 21.844 | 3.6 | 1.6516 | 58.5 |
| 5 | 77.366 | (Variable) | | |
| 6 | 18.186 | 0.5 | 2.00069 | 25.5 |
| 7 | 4.21 | 1.6 | | |
| 8 | −9.854 | 0.5 | 1.883 | 40.8 |
| 9 | −74.871 | 0.32 | | |
| 10 | −19.629 | 0.5 | 1.72916 | 54.7 |
| 11 | 6.637 | 0.25 | | |
| 12 | 7.742 | 1.3 | 1.92286 | 18.9 |
| 13 | −36.129 | (Variable) | | |
| 14(Stop) | ∞ | 0.15 | | |
| 15* | 18.809 | 2.35 | 1.58313 | 59.4 |
| 16* | −9.289 | 1.32 | | |
| 17 | −7.186 | 0.55 | 1.883 | 40.8 |
| 18 | 23.921 | 0.2 | | |
| 19 | 18.395 | 2.13 | 1.59282 | 68.6 |
| 20 | −8.279 | (Variable) | | |
| 21* | 40.296 | 2.5 | 1.6935 | 53.2 |
| 22 | −5.591 | 0.5 | 1.91082 | 35.3 |

-continued

| | | | | |
|---|---|---|---|---|
| 23 | −10.743 | (Variable) | | |
| 24 | ∞ | 2.1 | 1.51633 | 64.2 |
| Image plane | ∞ | | | |

Aspheric surface data

15th surface

K = −1.03304e+000    A4 = 2.99962e−004    A6 = −4.03075e−006
A8 = −7.03057e−008

16th surface

K = 1.20423e+000    A4 = 7.11903e−004    A6 = −3.72590e−006

21st surface

K = 6.45610e+000    A4 = 4.48579e−006    A6 = 5.90600e−007

Various data
Zoom ratio: 80.67

| | Wide-angle | Middle | Telephoto |
|---|---|---|---|
| Focal length | 1.80 | 19.73 | 145.27 |
| F-number | 2.03 | 2.75 | 5.92 |
| Image height | 1.15 | 1.15 | 1.15 |
| Total lens length | 75.03 | 75.03 | 75.03 |
| BF | 10.52 | 15.97 | 4.63 |
| Distance | | | |
| d5 | 0.67 | 23.07 | 28.67 |
| d13 | 30.66 | 8.26 | 2.66 |
| d20 | 6.60 | 1.15 | 12.50 |
| d23 | 8.14 | 13.59 | 2.24 |

NUMERICAL EXAMPLE 3

| Surface number | r | d | nd | vd |
|---|---|---|---|---|
| 1 | 44.768 | 1 | 1.90366 | 31.3 |
| 2 | 20.045 | 5.8 | 1.497 | 81.5 |
| 3 | −79.494 | 0.15 | | |
| 4 | 17.736 | 3.3 | 1.6779 | 55.3 |
| 5 | 59.986 | (Variable) | | |
| 6 | 17.882 | 0.5 | 2.0033 | 28.3 |
| 7 | 3.082 | 1.68 | | |
| 8 | −6.362 | 0.5 | 1.883 | 40.8 |
| 9 | 16.855 | 0.16 | | |
| 10 | 10.088 | 1.24 | 1.94595 | 18 |
| 11 | −16.5 | (Variable) | | |
| 13(Stop) | ∞ | 0.15 | | |
| 14* | 6.924 | 2.66 | 1.5311 | 55.9 |
| 15* | 12.073 | (Variable) | | |
| 16 | 14.596 | 2.45 | 1.72916 | 54.7 |
| 17 | −6.092 | 0.5 | 1.92286 | 20.9 |
| 18 | −12.449 | (Variable) | | |
| 19 | ∞ | 2.1 | 1.51633 | 64.2 |
| Image plane | ∞ | | | |

Aspheric surface data

14th surface

K = 3.09113e−001    A4 = 8.88978e−004    A6 = 6.16388e−006
A8 = −1.15738e−006    A10 = 6.22370e−008    A12 = 9.63845e−022

15th surface

K = 7.63417e+000    A4 = 1.55486e−003    A6 = 2.54276e−006
A8 = 4.90548e−007    A10 = −4.53517e−008

-continued

Various data
Zoom ratio: 64.99

| | Wide-angle | Middle | Telephoto |
|---|---|---|---|
| Focal length | 1.80 | 21.32 | 116.99 |
| F-number | 1.93 | 2.57 | 5.97 |
| Image height | 1.15 | 1.15 | 1.15 |
| Total lens length | 63.76 | 63.76 | 63.76 |
| BF | 9.79 | 15.12 | 4.81 |
| Distance | | | |
| d5 | 0.65 | 18.41 | 22.85 |
| d11 | 24.13 | 6.37 | 1.93 |
| d15 | 8.39 | 3.05 | 13.36 |
| d18 | 6.11 | 11.45 | 1.14 |

NUMERICAL EXAMPLE 4

| Surface number | r | d | Nd | vd |
|---|---|---|---|---|
| 1 | 44.181 | 1 | 2.0033 | 28.3 |
| 2 | 17.248 | 4.44 | 1.497 | 81.5 |
| 3 | −132.579 | 0.15 | | |
| 4 | 19.107 | 3.4 | 1.83481 | 42.7 |
| 5 | 243.367 | (Variable) | | |
| 6 | 36.854 | 0.5 | 2.0033 | 28.3 |
| 7 | 3.577 | 1.96 | | |
| 8 | −10.894 | 0.5 | 2.0033 | 28.3 |
| 9 | 45.665 | 0.1 | | |
| 10 | 8.141 | 1.8 | 1.94595 | 18 |
| 11 | −10.321 | 0.5 | 1.883 | 40.8 |
| 12 | 18.318 | (Variable) | | |
| 13(Stop) | ∞ | 0.15 | | |
| 14* | 9.562 | 1.36 | 1.58313 | 59.4 |
| 15* | 43.182 | (Variable) | | |
| 16* | 16.444 | 2.44 | 1.58313 | 59.4 |
| 17 | −5.903 | 0.5 | 1.94595 | 18 |
| 18 | −8.738 | (Variable) | | |
| 19 | ∞ | 1.89 | 1.51633 | 64.2 |
| Image plane | ∞ | | | |

Aspheric surface data

14th surface

K = 2.16118e−001    A4 = 4.69607e−004    A6 = 4.90912e−005
A8 = 1.73150e−007    A10 = 2.61798e−008

15th surface

K = 6.98905e+000    A4 = 8.78320e−004    A6 = 4.01259e−005
A8 = 2.65510e−006    A10 = −3.49292e−008

16th surface

K = 5.05978e−001    A4 = −2.42671e−004    A6 = −1.55001e−007
A8 = 1.08712e−007    A10 = −3.39122e−009

Various data
Zoom ratio: 59.25

| | Wide-angle | Middle | Telephoto |
|---|---|---|---|
| Focal length | 1.80 | 20.45 | 106.86 |
| F-number | 2.06 | 2.57 | 6.09 |
| Image height | 1.15 | 1.15 | 1.15 |
| Total lens length | 61.13 | 61.13 | 61.13 |
| BF | 9.87 | 15.83 | 5.47 |
| Distance | | | |
| d5 | 0.39 | 16.38 | 20.38 |
| d12 | 21.83 | 5.84 | 1.84 |
| d15 | 9.59 | 3.63 | 13.99 |
| d18 | 6.45 | 12.42 | 2.05 |

TABLE 1

| Condition | | Example 1 | Example 2 | Example 3 | Example 4 |
|---|---|---|---|---|---|
| (1) | $f1/fw$ | 24.0 | 20.4 | 16.4 | 14.5 |
| (2) | $f2/\sqrt{(fw \cdot ft)}$ | −0.251 | −0.244 | −0.244 | −0.228 |
| (3) | $f4/fw$ | 10.0 | 8.9 | 6.2 | 6.9 |
| (4) | $N2a$ | 1.92 | 1.87 | 1.94 | 1.96 |
| (5) | $f3/fw$ | 11.5 | 11.9 | 14.4 | 11.5 |
| (6) | $vdp$ | 95.0 | 81.5 | 81.5 | 81.5 |
| (7) | $\theta gFp - (0.644 - 0.00168 \cdot vdp)$ | 0.050 | 0.032 | 0.032 | 0.032 |
| (8) | $M2/ft$ | 0.21 | 0.19 | 0.19 | 0.19 |

Next, a video camera (optical apparatus) as a photographic optical system employing the zoom lens according to an exemplary embodiment of the invention will be described with reference to FIG. 9. Referring to FIG. 9, the video camera includes a video camera body 10, a photographic optical system 11 including the zoom lens described in any one of the first to fourth exemplary embodiments. A solid-state image sensor 12 (photoelectric conversion element), such as a CCD sensor or a CMOS sensor, mounted on the camera body 10 to receive light of an object image formed by the photographic optical system 11, a recording unit 13 for recording information corresponding to the object image photoelectrically converted by the solid-state image sensor 12, and a viewfinder 14 for observing an object image displayed on a display element (not illustrated).

The display element includes a liquid crystal display panel and the like to display the object image formed on the image sensor 12. In this manner, by applying the zoom lens according to an exemplary embodiment of the invention to an image pickup apparatus such as a video camera, it is possible to implement a miniaturized image pickup apparatus having a high optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-093215 filed Apr. 19, 2011, which is hereby incorporated by reference herein in its entirety.

What is claimed is:

1. A zoom lens comprising, in order from an object side to an image side:
a first lens unit having a positive refractive power;
a second lens unit having a negative refractive power;
a third lens unit having a positive refractive power; and
a fourth lens unit having a positive refractive power,
wherein the second and fourth lens units move during zooming,
wherein the first and third lens units do not move for zooming, and
wherein the following conditions are satisfied:

$12.0 < f1/fw < 28.0$ $-0.265 < f2/\sqrt{(fw \cdot ft)} < -0.20$ $5.9 < f4/fw < 12.0$ where fw denotes a focal length of the entire zoom lens at a wide-angle end, ft denotes a focal length of the entire zoom lens at a telephoto end, f1 denotes a focal length of the first lens unit, f2 denotes a focal length of the second lens unit, and f4 denotes a focal length of the fourth lens unit.

2. The zoom lens according to claim 1, wherein the following condition is satisfied:

$1.80 < N2a < 2.05$ where N2a denotes an average refractive index of materials of negative lenses included in the second lens unit with respect to d-line.

3. The zoom lens according to claim 1, wherein the following condition is satisfied:

$9.0 < f3/fw < 17.0$ where f3 denotes a focal length of the third lens unit.

4. The zoom lens according to claim 1, wherein the following conditions are satisfied:

$70 < vdp$ $0.004 < \theta gFp - (0.644 - 0.00168 \cdot vdp) < 0.060$ where vdp and θgFp denote an Abbe number and a relative partial dispersion, respectively, of a material of at least one positive lens included in the first lens unit.

5. The zoom lens according to claim 1, wherein the following condition is satisfied:

$0.15 < M2/ft < 0.23$ where M2 denotes a movement amount of the second lens unit for zooming from the wide-angle end to the telephoto end.

6. The zoom lens according to claim 1, wherein the third lens unit includes a positive lens having an aspheric shape.

7. The zoom lens according to claim 1, wherein the fourth lens unit includes a cemented lens obtained by cementing a positive lens and a negative lens.

8. An image pickup apparatus comprising:
a zoom lens; and
a solid-state image sensor configured to receive an image formed by the zoom lens,
wherein the zoom lens comprises, in order from an object side to an image side:
a first lens unit having a positive refractive power;
a second lens unit having a negative refractive power;
a third lens unit having a positive refractive power; and
a fourth lens unit having a positive refractive power,
wherein the second and fourth lens units move during zooming,
wherein the first and third lens units do not move for zooming, and
wherein the following conditions are satisfied:

$12.0 < f1/fw < 28.0$ $-0.265 < f2/\sqrt{(fw \cdot ft)} < -0.20$ $5.9 < f4/fw < 12.0$ where fw denotes a focal length of the entire zoom lens at a wide-angle end, ft denotes a focal length of the entire zoom lens at a telephoto end, f1 denotes a focal length of the first lens unit, f2 denotes a focal length of the second lens unit, and f4 denotes a focal length of the fourth lens unit.

9. The image pickup apparatus according to claim 8, further comprising a correction unit configured to correct distortion of the image by an image processing.

* * * * *